United States Patent [19]

Pertler

[11] Patent Number: 5,028,755
[45] Date of Patent: Jul. 2, 1991

[54] SPARK EROSION MACHINE TOOL

[75] Inventor: Helmut Pertler, Haar, Fed. Rep. of Germany

[73] Assignee: Messerschmitt-Boelkow-Blohm GmbH, Munich, Fed. Rep. of Germany

[21] Appl. No.: 440,602

[22] Filed: Nov. 22, 1989

[30] Foreign Application Priority Data

Nov. 26, 1988 [DE] Fed. Rep. of Germany ....... 3839962

[51] Int. Cl.$^5$ .............................................. B23H 7/26
[52] U.S. Cl. .................................. 219/69.2; 219/69.15
[58] Field of Search ............... 219/69.11, 69.15, 69.16, 219/69.2

[56] References Cited

U.S. PATENT DOCUMENTS

| | | | |
|---|---|---|---|
| 2,909,640 | 10/1959 | Fairbrother | 219/69.15 |
| 3,816,693 | 6/1974 | Braun | 219/69.15 |
| 3,890,481 | 6/1975 | Buck | 219/69.2 |
| 3,920,947 | 11/1975 | Wachtell et al. | 219/69.15 |
| 4,950,860 | 8/1990 | El-Menshawy | 219/69.15 |

FOREIGN PATENT DOCUMENTS 2355373 3/1975 Fed. Rep. of Germany .

OTHER PUBLICATIONS

"Elektroerosive Metallbearbeitung", by M. Feurer, Vogel Verlag, Wuerzburg, 12/1983, p. 25, FIG. 2.4.

Primary Examiner—Geoffrey S. Evans
Attorney, Agent, or Firm—W. G. Fasse; D. H. Kane, Jr.

[57] ABSTRACT

A spark erosion machine tool is equipped with a drive head carrying, at an angle to its moving direction, a plurality of drive slides, with a stationary work piece holder, and with a plurality of movable spark erosion electrode mounting bucks. The drive slides (4) cooperate with the mounting bucks (20) for converting the movement of the drive head into a movement of the spark erosion electrodes. For example, when the drive head is a ring, its axial movement relative to a round work piece, such as a combustion chamber of a jet engine, is converted into radial movements of the erosion electrodes for plunge cutting cooling slots or openings into the outer jacket of the combustion chamber. Thus, many slots can be cut simultaneously. The movable mounting bucks (20) carry electrode holders (16) and the bucks are movably supported on guide rods (25) in the stationary work piece holder. The electrodes with their holders are guided in slots (14) of the work piece holder. The drive slides (4) are guided in slots (15) of the work piece holder (13).

8 Claims, 3 Drawing Sheets

SPARK EROSION MACHINE TOOL

FIELD OF THE INVENTION

The invention relates to a spark erosion machine tool, more specifically, a spark erosion machine tool in which a plunge cut may be performed by means of a spark erosion electrode.

BACKGROUND INFORMATION

A spark erosion machine tool capable of performing a plunge cut is disclosed on page 25 of a book entitled "Elektroerosive Metallbearbeitung" (Electro-erosive Metal Working) by Manfred Feurer, published 1983, by Vogel Book Publishers, Wuerzburg, Federal Republic of Germany. The cutting of an inner groove is shown in FIG. 2.4. The known machine is capable of plunge cutting an inner groove in a round hollow work piece by means of a single electrode. Such machine tool is not suitable for operating a plurality of electrodes simultaneously.

German Patent Publication (DE-AS) 2,355,373 describes an apparatus for changing the direction of the feed advance motion in machine tools, especially for an electro-erosive or electrochemical working of a work piece. Here again, the known apparatus is capable of operating but one electrode. This known apparatus is not suitable for conversion to use with a plurality of electrodes, nor is it suitable for use on work pieces having a round configuration. The effort and expense for any conversion in this respect would be prohibitive because each electrode would require its own operating mechanism.

OBJECTS OF THE INVENTION

In view of the foregoing it is the aim of the invention to achieve the following objects singly or in combination:

to provide a spark erosion machine tool capable of performing a plunge cutting operation simultaneously with a plurality of spark erosion electrodes;

to construct such a machine tool so that it is capable to plunge cut the outer surface of a round work piece simultaneously with several electrodes; and to convert an axial drive motion relative to a round work piece into a radial tool motion relative to said axial drive motion, whereby the direction of the axial drive motion coincides with the central longitudinal axis of a round work piece, for example, a combustion chamber of a jet engine.

SUMMARY OF THE INVENTION

A spark erosion machine tool capable of performing a plunge cut according to the invention is characterized by the following features. An axial movement of a drive head, especially a vertical movement of the drive head, is converted into a radial movement, especially a horizontal feed advance movement of a plurality of electrode holders each carrying a respective plunge cutting spark erosion electrode, particularly for machining a round work piece such as a combustion chamber of a jet engine. A stationary housing ring surrounds the round work piece on the outside thereof. The housing ring supports the work piece in the center thereof and a plurality of electrode holders in the side wall of the housing ring. The electrode holders are in turn mounted on movable mounting bucks, each carrying its respective electrode holder for a controlled machining of the work piece. The mounting bucks are operated by the drive head which carries a slide drive member for each mounting buck. Each slide drive member extends at an angle to the axial movement direction of the drive head so that the axial movement of the drive head, especially a vertical movement of the drive head, is converted into a radial movement, especially a horizontal and radial movement of the respective spark erosion electrodes.

By driving a plurality of electrodes with a single drive head a substantial economy has been achieved according to the invention. More specifically, by arranging the plurality of electrodes on movable mounting bucks which are movable relative to the stationary mounting ring surrounding the round work piece, it becomes possible to perform a number of machining operations simultaneously, which number corresponds to the number of electrodes being moved simultaneously. As a result, the invention achieves a substantial saving of man hours. For example, in order to plunge cut by spark erosion 360 inlet openings into a respective number of cooling slots, it becomes possible to operate 45 electrodes simultaneously. Thus, it is now possible to cut all 360 inlet openings by resetting, or rather turning the group of electrodes only eight times, whereby a controlled spark gap width is assured. The electrodes are held by their electrode holders in an electrically insulated manner and it is possible to selectively energize these electrodes all in unison by a single electrical power generator or by energizing these electrodes in groups through several such generators. Incidentally, the cutting of the inlet openings becomes necessary because after the cooling slots have been formed in the outer surface of the combustion chamber wall, the combustion chamber is provided with an outer jacket, for example, a nickel jacket applied by galvanic deposition. The plunge cutting then must form the inlet openings through the nickel jacket.

BRIEF DESCRIPTION OF THE DRAWINGS

In order that the invention may be clearly understood, it will now be described, by way of example, with reference to the accompanying drawings, wherein.

Figure 1:
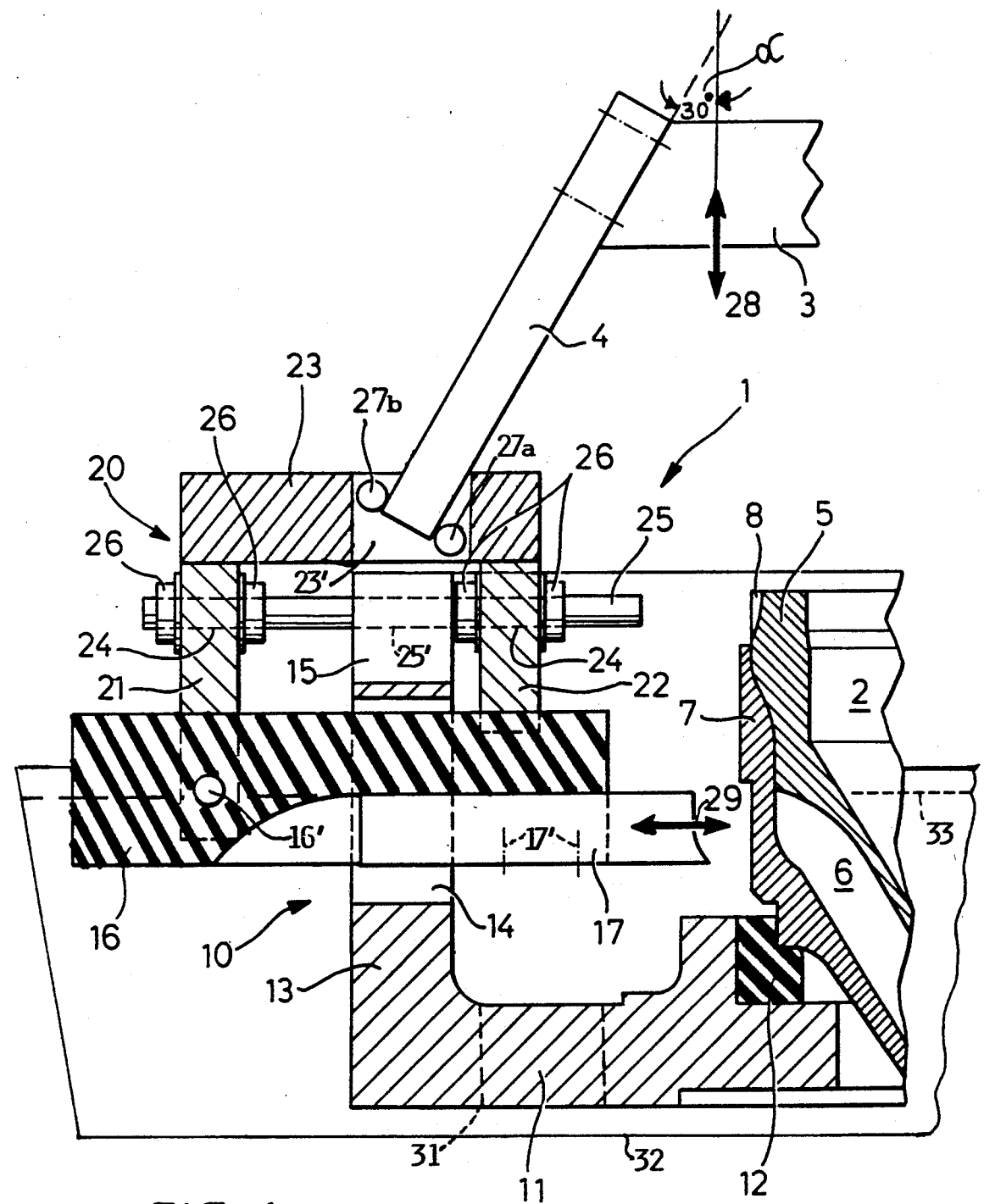
FIG. 1 is a partial sectional view through a machine tool according to the invention for plunge cutting by spark erosion a plurality of inlet openings into cooling slots in the outer surface of a combustion chamber, whereby only one electrode is shown in a position prior to the plunge cutting operation.

DETAILED DESCRIPTION OF PREFERRED EXAMPLE EMBODIMENTS AND OF THE BEST MODE OF THE INVENTION

The spark erosion machine tool 1 according to the invention is of rotational symmetry relative to a central vertical axis extending in parallel to the arrow 28. Therefore, it is sufficient to show but one side of the present spark erosion machine tool 1 for plunge cutting by spark erosion, inlet openings 30, shown in FIG. 2, through a jacket 7 of a round work piece, for example, in the form of a combustion chamber component for a jet engine. A drive head 3 carrying a plurality of slides drive 4 around its circumference, is movable back and forth or up and down in the direction of the arrow 28 by conventional drive means not shown, such as a piston cylinder drive. Each drive slide 4 is rigidly secured to the drive head 3. The slides drive 4 are arranged at an angle $\alpha$ relative to the movement direction 28 for converting the axial movement of the drive head 3 into a radial back and forth movement as indicated by the arrow 29 in FIG. 1. The angle $\alpha$ is preferably within the range of up to 30°.

Figure 2:
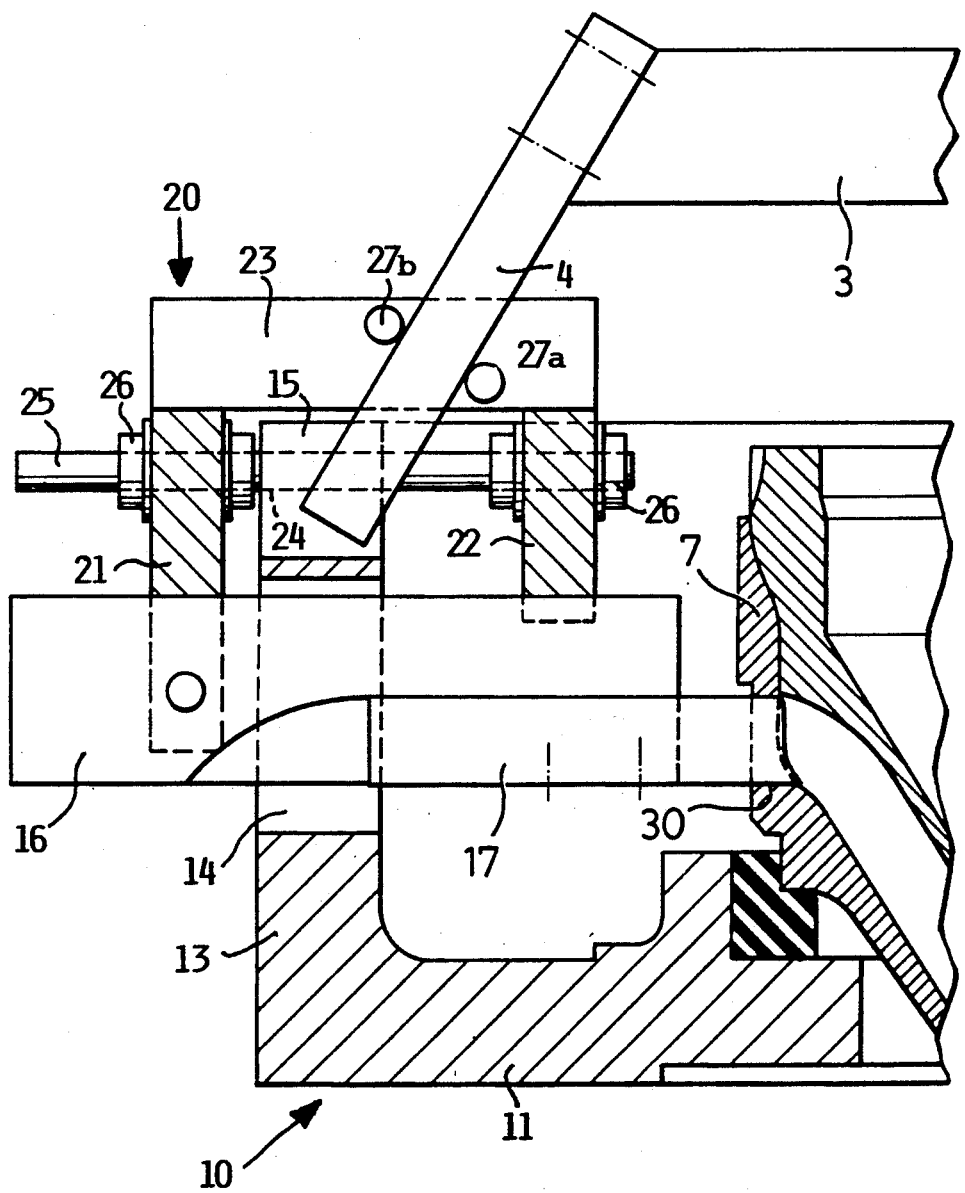
FIG. 2 is a view similar to that of FIG. 1, but showing one electrode in the position when the plunge cutting stroke is completed.

FIGS. 1 and 2 only show one electrode 17 mounted in an electrically insulated manner in an electrode holder 16 which itself may be of electrically insulating material or which is capable of holding the respective electrode 17 in an electrically insulating manner. Although only one electrode is shown, it will be appreciated that, for example 45 electrodes may be distributed around the stationary mounting ring or housing ring 10. The round work piece 2 forming, for example, a portion of a combustion chamber of a jet engine, has a side wall 5 provided with 360, for example, cooling slots 6 in a previous manufacturing step. The position of these cooling slots 6 is marked with notches 8 in the outer surface of the combustion chamber housing wall 5. After the slots 6 have been formed, these slots must be closed again in order to provide the combustion chamber with an outer jacket 7, for example, a nickel jacket formed by galvanic deposition. It is the purpose of the invention to cut inlet openings 30 through the nickel jacket 7 to provide for a free cooling medium flow through the cooling slots 6.

The work piece 2 is mounted by conventional means in a stationary mounting ring 10 centrally thereof, whereby an insulating material spacer ring 12 electrically insulates the housing 2 with its jacket 7 from the horizontal radially extending ring bottom 11 of the mounting ring 10. The ring 10 further has a substantially cylindrical vertically extending ring wall or section 13 in which a plurality of mounting bucks 20 are movably supported as will be described in more detail below.

Figure 3:
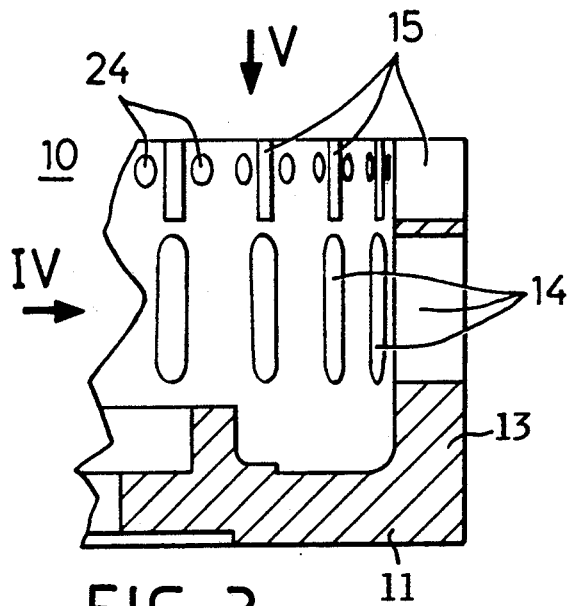
FIG. 3 is a sectional view through the right-hand portion of the housing ring forming the stationary mounting.
Figure 4:
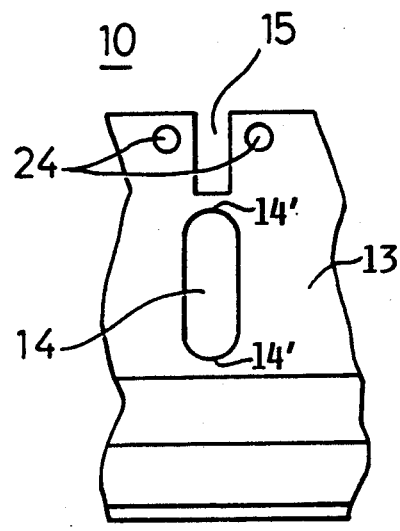
FIG. 4 shows a view radially outwardly against the inner surface of the mounting ring side wall as seen in the direction of the arrow IV in FIG. 3.

As best seen in FIGS. 3 and 4, the vertical section 13 of the mounting ring 10 is provided with guide slots 14 having rounded ends 14'. Additional slots 15 which are open at the top are vertically aligned with the slots 14 in the vertical wall section 13 of the mounting ring 10. As mentioned, a total of 45 slots are provided for a total of 45 mounting bucks 20 for a respective number of electrodes 17. The electrode holders 16 are secured at 16' to mounting legs 21, 22 of the respective mounting buck 20. The legs 21 and 22 are interconnected by a bridging member 23 provided with a slot 23' which is vertically aligned with the respective slots 14, 15. The electrodes 17 are screwed at 17' to the respective holder 16. Thus, these electrodes are easily replaceable.

The mounting bucks 20 and their movable support on the vertical ring wall section 13 of the mounting ring 10 will now be described. Each buck leg 21, 22 is provided with two guide bores 24 extending in parallel to each other in the same leg and in axial alignment from one leg to the other. A guide rod 25 is slideably received in each pair of bores 24. Thus, two guide rods 25 extend in parallel to each other. The guide rods 25 are rigidly mounted at 25' in the upright section 13 on both sides of each slot 15. For an improved guiding of the mounting bucks 20 each bore 24 may be provided with slide bushings 26 as best seen in FIGS. 1 and 2. In FIG. 1, the mounting buck 20 is shown in its leftmost radially outward position while in FIG. 2 the mounting buck 20 is shown in its rightmost radially inward position. The same guided movement of the mounting bucks 20 can be achieved if the guide rods 25 are rigidly secured to the legs 21, 22 and if the guide rods 25 are slideable at 25' relative to the stationary upright section 13.

The bridges 23 are provided with guide cam pins 27a and 27b between which the respective drive slide 4 is slidingly guided during its driving movement. Additionally, the drive slides 4 are guided in the respective slot 23' so that all sides of the drive slides 4 are precisely guided in a slideable manner, thereby assuring a precise movement of the mounting bucks 20 radially inwardly and outwardly as indicated by the arrow 29. As best seen in FIG. 2, when the radially innermost position is reached, the lower end of the drive slide 4 dips into its respective upwardly open slot 15 in the sidewall 13 and through the space between the two guide rods 25. The radially outermost position of the bucks 20 shown in FIG. 1 corresponds to the uppermost position of the drive head 3 while the radially innermost position of the bucks 20 shown in FIG. 2 corresponds to the lowermost position of the drive head 3.

In operation, when the drive head 3 is lowered, in the direction of the arrow 28, the drive slides 4 slide in the space between the guide cam pins 27a, 27b, thereby pressing the respective mounting 20 along the guide rods 25 to the right or radially inwardly, whereby the respective electrode 17 moves in the direction of the arrow 29 radially inwardly to cooperate with the nickel jacket 7 which functions as a counter-electrode for the plunge cutting by spark erosion. In order to assure a fault-free electro-erosive material removal for the formation of the inlet openings 30 through the nickel jacket 7, it is preferable to surround the just described mechanism by a trough 32 holding an electrically non-conducting liquid 33 that reaches to a level keeping the top edge of the electrodes 17 immersed in the liquid 33. As mentioned, the electrode holder 16 and the spacer ring 12 for the mounting of the work piece 2 are made of electrically insulating material, such as synthetic material. The bottom 11 of the mounting ring 10 is provided with holes 31 also seen in FIG. 5 for the removal of the eroded material in the form of a sludge. For this purpose, the liquid 33 is circulated in the trough by pump means not shown.

Referring again to FIGS. 1 and 2 in conjunction, as the drive head 3 continues to be forced downwardly, the horizontal, radially inwardly directed force components of all the drive slides 4 are transmitted through the cam pins 27a to the respective bucks 20, whereby the electrodes 17 cut the slots 30 shown in FIG. 2. When a cutting is completed, the drive head 3 is lifted, whereby the drive slides 4 bear against the cam pins 27b and the radially outwardly directed force components drive the bucks 20 radially outwardly. Excellent material removal has been achieved by energizing each electrode 17 individually by its own power supply control, whereby each electrode 17 is electrically insulated from any of the other electrodes. However, good results can also be achieved by arranging the electrodes in groups. For example, all 45 electrodes 17 can be energized from a single power generator having four outputs.

Figure 5:
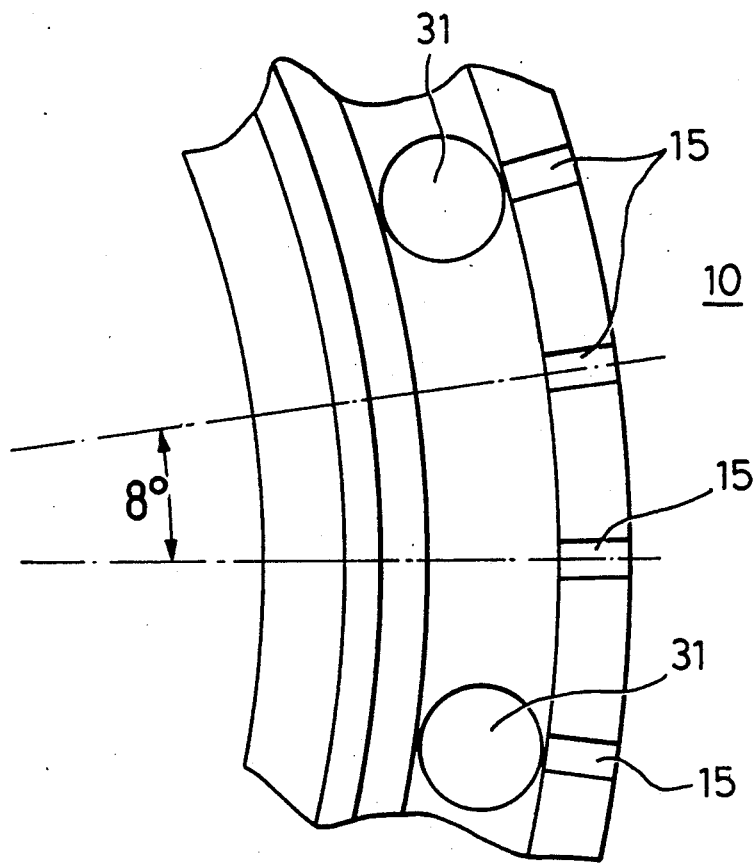
FIG. 5 is a view into the pot shaped mounting ring in the direction of the arrow V in FIG. 3.

FIGS. 3, 4, and 5 further illustrate the above mentioned features of the mounting ring 10, whereby FIG. 3 illustrates the right-hand portion of the mounting ring as compared to the left-hand portions shown in FIGS. 1 and 2. Each electrode holder 16 moves in its own slot 14 and these slots together with the slots 15 are spaced, for example, by 8° to mount the above mentioned total of 45 electrodes. Due to the vertical alignment of the slots 14 and 15, the vertical alignment of the electrode holders 16 with the drive slides 4 is also assured.

For example, if, as mentioned above, 360 cooling slots 6 are provided, the electrodes must be reset eight times and each electrode would cut eight inlet openings 30 in sequence. The marking notches 8 facilitate the resetting of the electrode for alignment with the next successive cooling slot 6.

Although the invention has been described with reference to specific example embodiments, it will be appreciated that it is intended to cover all modifications and equivalents within the scope of the appended claims.

What I claim is:

1. A spark erosion machine tool for plunge cutting slots in a wall of a round work piece (2) by means of spark erosion electrodes, comprising a plurality of movable mounting bucks (20) mounting spark erosion electrodes for movement in a direction relative to said round work piece, a stationary mounting ring (10) for mounting said round work piece in a fixed position relative to said movable mounting bucks (20), a plurality of electrode holders (16) each carrying one of said spark erosion electrodes, each mounting buck carrying one electrode holder for a controlled movement of the respective spark erosion electrode, said stationary mounting ring (10) comprising means (25) for slideably supporting said mounting bucks in a guided manner, and drive means (3, 4) arranged for moving said movable mounting bucks (20) and said spark erosion electrodes toward and away form said work piece, said drive means comprising a ring drive head (3) movable in an axial direction relative to said round work piece, and a plurality of drive slides (4) rigidly secured to said drive head (3) at a fixed angle (60) relative to said axial direction, and engaging means (27a, 27b) on said mounting bucks (20) for slidingly engaging each drive slide (4) with its respective mounting buck (20) for moving said respective mounting buck (20) with its electrode holder back and forth toward and away from said round work piece when said drive head (3) moves axially toward and away from said round work piece.

2. The machine tool of claim 1, wherein said stationary mounting ring has a circular pot configuration with a vertical axis including a bottom (11) extending radially relative to said vertical axis and a substantially cylindrical side wall (13) extending parallel to said vertical axis, said bottom (11) comprising electrically insulating ring means (12) for supporting said round work piece.

3. The machine tool of claim 1, wherein said drive head (3) with its drive slides (4) moves vertically, and wherein each of said mounting bucks (20) with its electrode holder is moved substantially radially and horizontally toward and away from said round work piece (2).

4. The machine tool of claim 1, wherein said mounting ring (10) has an L-shaped cross-section, said L-shaped cross-section having a radially extending bottom (11) and a wall section (13) extending axially and in parallel to said axial direction, said radially extending bottom (11) comprising means for supporting said round work piece (2), said axially extending wall section (13) comprising guide means (25) for each of said mounting bucks (20), whereby relative movement between each of said mounting bucks and said axially extending wall section of said mounting ring (10) is permitted.

5. The machine tool of claim 4, wherein said wall section (13) has first guide slots (14) therein for guiding said electrode holders (16), and second guide slots (15) for slideably guiding said drive slides (4) carried at said fixed angle ($\alpha$).

6. The machine tool of claim 5, wherein said first guide slots (14) are elongated slots having rounded ends, and wherein each said second guide slots (15) has one open end.

7. The machine tool of claim 1, wherein said round work piece is a jet engine combustion chamber having cooling slots (6) in its radially outwardly facing wall and an outer nickel jacket (7) enclosing said combustion chamber, said outer nickel jacket initially closing said cooling slots, and wherein said spark erosion electrodes (17) are constructed to perform said spark erosion plunge cutting for forming inlet openings (30) into said cooling slots.

8. The machine tool of claim 1, further comprising a tub (32) for holding an electrically insulating fluid, and wherein said spark erosion electrodes are immersed in said electrically insulating fluid in said tub.

* * * * *